United States Patent Office 2,797,203
Patented June 25, 1957

2,797,203

PROCESS FOR MAKING MOLDING COMPOSITIONS OF POLYSTYRENE AND COPOLYMERS OF STYRENE AND BUTADIENE

Earnway A. Barber, Farwell, Bernard H. Tubbs, Clare, Floyd B. Nagle, Midland, and Arthur F. Roche, Freeland, Mich., assignors to The Dow Chemical Company, Midland, Mich., a corporation of Delaware No Drawing. Application January 27, 1954, Serial No. 406,577

5 Claims. (Cl. 260—33.2)

This invention relates to the production of thermoplastic molding compositions comprising an alkenyl aromatic resin and a synthetic rubber. It pertains especially to an improved procedure for incorporating a synthetic rubbery elastomer with a thermoplastic alkenyl aromatic resin, e. g. polystyrene.

Compositions of polystyrene and natural or a synthetic rubber and methods of making the same are well known. A procedure commonly employed for incorporating a rubbery elastomer with polystyrene consists in mechanically working or milling the ingredients with one another at elevated temperatures in a Banbury mixer or on compounding rolls. Prolonged milling or mechanical working of the heat-plastified ingredients with one another is usually required to obtain a uniform composition. Such an operation is time-consuming and costly, and is undesirable for production of such compositions on a commercial scale. It restricts greatly the manner of incorporating the ingredients with one another to obtain a uniform composition, and requires careful control in order to avoid excessive molecular breakdown of the polymeric components with resultant impairment of the mechanical properties of the composition.

It is a primary object of the invention to provide a procedure for rapidly and efficiently incorporating a synthetic rubbery elastomer with a thermoplastic alkenyl aromatic resin to obtain a uniform composition. Another object is to provide certain agents which have a dispersing action for rapidly blending a heat-plastified synthetic rubbery elastomer and an alkenyl aromatic resin with one another to produce a uniform composition. Still another object is to provide an improved method for making molding compositions comprising an alkenyl aromatic resin and a synthetic rubber. A specific object is to provide a method for incorporating polystyrene and a copolymer of styrene and butadiene with one another to yield a uniform composition with a minimum amount of mechanical working at elevated temperatures. Other and related objects may appear from the following description of the invention.

According to the invention homogeneous molding compositions comprising a thermoplastic alkenyl aromatic resin and a rubbery copolymer of styrene and butadiene can readily be obtained by a procedure which involves dispersing or dissolving a polyethylene glycol having a molecular weight between 200 and 600 in a synthetic latex comprising an aqueous colloidal dispersion of a copolymer of styrene and butadiene, drying the latex and incorporating the latex solids with an alkenyl aromatic resin by mechanically working the ingredients in admixture with one another at elevated temperatures.

As the rubbery elastomers to be employed in preparing the compositions, copolymers of from 30 to 70 percent by weight of butadiene and from 70 to 30 percent of styrene are preferred. Synthetic latexes, i. e. aqueous colloidal dispersions, of the copolymers can be prepared by polymerizing a mixture of monomeric butadiene and styrene in aqueous emulsion in usual ways. Mixtures of two or more aqueous colloidal dispersions of such copolymers may also be used.

The polyethylene glycols to be employed are linear diols containing the recurring oxyethylene group and should have an average molecular weight of from 200 to 600. It is understood that the polyethylene glycols are mixtures of linear polyoxyethylene diols having molecular weights ranging from somewhat below to somewhat above the average value.

The polyethylene glycols are preferably glycols having a molecular weight corresponding to the general formula $HO(C_2H_4O)_nH$, wherein $n$ is a whole number from 4 to 13. Such polyethylene glycols are clear colorless liquids and appear to be soluble in the polymeric components in small proportions, e. g. in amount corresponding to 5 percent by weight or less of the final composition, and have a dispersing action for rapidly blending a heat-plastified thermoplastic alkenyl aromatic resin and a synthetic rubbery elastomer of butadiene and styrene with one another to obtain a uniform composition with a minimum amount of mechanical working at elevated temperatures. Polyethylene glycols of lower, or higher, molecular weights, e. g. triethylene glycol, or polyethylene glycol having a molecular weight of 1000, are less satisfactory than are the polyethylene glycols having a molecular weight of from 200 to 600.

The polyethylene glycol is usually employed in amount corresponding to from 0.5 to 5, preferably from 1 to 3 percent of the weight of the copolymer of butadiene and styrene.

As the alkenyl aromatic resin starting material there may be employed one or more thermoplastic polymers of at least one monoalkenyl aromatic hydrocarbon of the benzene series. Polymers of one or more monovinyl aromatic hydrocarbons such as styrene, vinyltoluene, ar-ethylvinylbenzene, vinylxylene, ar-isopropylvinylbenzene, or copolymers of a predominant amount of at least one such monovinyl aromatic hydrocarbon and from 1 to 30 percent by weight of an alphaalkyl styrene such as alpha-methylstyrene, para-methyl-alpha-methylstyrene, or alpha-ethylstyrene, are preferred.

In practice, the polyethylene glycol is mixed with, or dissolved in, the synthetic latex, or aqueous colloidal dispersion of the copolymer of styrene and butadiene, in the desired proportion. The latex is dried in usual ways, e. g. by heating in vacuum or on heated rolls, or by spray drying, to vaporize and remove the water and recover the latex solids. The latex solids comprising an intimate mixture of the rubbery copolymer and the polyethylene glycol, if in massive form, is preferably cut or shreaded to obtain discrete particles of the same suitable for mixing with the alkenyl aromatic resin in granular form. The latex solids is usually mixed with the alkenyl aromatic resin in granular form in proportions corresponding to from 15 to 40 percent by weight of the latex solids and from 85 to 60 percent of the alkenyl aromatic resin. The mixture of ingredients is heat-plastified and mechanically worked at temperatures between 150° and 250° C. to intimately incorporate the components with one another with resultant formation of a uniform composition. Mixing of the heat-plastified ingredients may be carried out in usual ways such as by milling the same on heated compounding rolls, or by mechanical working of the mixture of ingredients in a Banbury mixer, or a plastics extruder such as is described in U. S. Patent No. 2,488,189.

Alternatively, the alkenyl aromatic resin may be heat-plastified on rolls, or in a Banbury mixer, and the latex solids added thereto and the mixture mechanically worked to obtain a uniform dispersion or composition of the ingredients. The composition is usually cooled and cut or broken to a granular form suitable for molding.

The invention provides a way for rapidly blending a rubbery elastomer with a thermoplastic alkenyl aromatic resin to obtain a uniform composition suitable for molding by usual injection, extrusion or compression molding operations to form plastic articles having good mechanical properties such as tensile strength, impact strength and percent elongation, and which plastic articles are free, or substantially free, from gel particles or "fish-eyes" of the non-uniformly dispersed rubbery elastomer.

The following examples illustrate ways in which the principle of the invention has been applied, but are not to be construed as limiting its scope.

Example 1

A charge of 9.6 grams of polyethylene glycol having an average molecular weight of 600 was mixed with 1000 grams of a batch of a synthetic latex containing 48 percent by weight of a copolymer (prepared by polymerizing a mixture of 60 percent by weight of styrene and 40 percent of butadiene in aqueous emulsion by procedure similar to that described in Example 1 of U. S. Patent No. 2,498,712). The latex was dried on a roll heated at a temperature of 150° C. The coating of dried latex solids was scraped from the roll and ground to flakes of approximately ¼ inch size. A charge of 105 grams of the dried latex solids was dry mixed with 195 grams of granular molding grade polystyrene containing one percent by weight of white mineral oil as lubricant. The mixture was heat-plastified and milled on a pair of 3-inch diameter by 8-inches long internally heated compounding rolls. One of the rolls was heated at a temperature of 280° F. and the other roll was heated at a temperature of 230° F. The mixture was mechanically worked on the rolls for a period of 6 minutes then sheeted out, cooled and crushed to a granular form suitable for molding. A portion of the granular composition was injection molded to form test bars of ⅛ x ½ inch cross section. These test bars were used to determine the tensile strength, percent elongation and impact strength for the composition. The procedure for determining the tensile strength and percent elongation was similar to that described in ASTM D638–44T, and the procedure followed in measuring impact strength was similar to that described in ASTM D256–43T. Other molded test pieces of the product were used to determine the heat distortion temperature by a procedure of Heirholzer and Boyer, ASTM Bulletin No. 134 of May 1945. The composition had the properties:

| | | |
|---|---|---|
| Tensile strength | lbs./sq. in. | 3840 |
| Notched impact strength | ft.-lbs. | 7.6 |
| Elongation | percent | 23 |
| Heat distortion temperature | °C. | 74 |

Other portions of the composition were compression molded to form thin plates. The molded plates were free from gel particles of the copolymer. For purpose of comparison, a comopsition was prepared from similar proportions of the batch of the polystyrene, and latex solids from a portion of the batch of latex with no polyethylene glycol added, under similar compounding conditions as described above. When this composition was compression molded to from thin plates, it was found to contain a large number of "fish eyes" or gel particles of the non-uniformly dispersed copolymer, i. e. the latex solids.

Example 2

A charge of 9.6 grams of polyethylene glycol having an average molecular weight of 200 was mixed with 1000 grams of a batch of a synthetic latex containing 48 percent by weight of a rubbery copolymer similar to that described in Example 1. The latex was dried on a roll heated at a temperature of 150° C. The coating of dried latex solids was scraped from the roll and ground to a flake form. A charge of 105 grams of the latex solids was dry mixed with 195 grams of a batch of a solid copolymer of 85 percent by weight styrene and 15 percent alpha-methylstyrene, in granular form. The mixture was fed to a laboratory extruder having a 1-inch diameter screw, wherein it was heated at a temperature of from 405° F. to 450° F. and extruded through a ⅜₆ diameter nozzle. The mixing time, i. e. the time required for an infinitesimal portion of the mixture to travel through the extruder, was approximately 3 minutes. The extruded material was cooled and cut to a granular form. A portion of the product was compression molded to form test plates approximately 0.02 inch thick. The test plates were free from gel particles of the rubbery copolymer, i. e. the product was a uniform composition.

In contrast, a mixture of a portion of the batch of the granular copolymer and latex solids without the polyethylene glycol component, when heat-plastified and mechanically worked by similar procedure, then molded to form thin plates was found to contain many gel particles of the non-uniformly dispersed latex solids.

Example 3

A charge of 9.6 grams of polyethylene glycol having an average molecular weight of 600 was mixed with 1000 grams of a batch of a synthetic latex containing 48 percent by weight of a copolymer similar to that described in Example 1. The latex was dried to recover the latex solids. A charge of 105 grams of the latex solids and 195 grams of a hard granular copolymer similar to that described in Example 2, were dry mixed. The mixture was fed to the laboratory extruder and heat-blended as described in Example 2. Compression molded test plates prepared from the composition were nearly free from gel particles of the latex solids.

Example 4

A charge of 9.6 grams of polyethylene glycol having an average molecular weight of 600 was mixed with 1000 grams of a synthetic latex containing 48 percent by weight of a rubbery copolymer. The latex employed in the experiment was prepared by polymerizing a mixture of 70 percent by weight of butadiene and 30 percent of styrene in aqueous emulsion. The latex containing the polyethylene glycol was dried on a roll heated at a temperature of 150° C. The coating of dried latex solids was scraped from the roll and shredded. A charge of 60 grams of the latex solids was dry mixed with 240 grams of a solid granular copolymer of 85 percent by weight styrene and 15 percent alpha-methyl-styrene. The mixture was fed to the laboratory extruder and heat-blended as described in Example 2. Compression molded test plates of the composition were found to contain very small gel particles of the dispersed latex solids. A similar composition of the copolymer and latex solids without the polyethylene glycol was found to form molded test plates containing many large gel particles of the non-uniformly dispersed rubbery copolymer.

Example 5

A charge of 2.4 grams of polyethylene glycol having an average molecular weight of 600 was dissolved in 1000 grams of a synthetic latex similar to that described in Example 1. The latex was dried on a roll heated at a temperature of 150° C. and scraped therefrom as flakes. A charge of 105 grams of the dried latex solids was mixed with 195 grams of a granular copolymer of 85 percent by weight styrene and 15 percent alpha-methylstyrene. The mixture was fed to the laboratory extruder and heat-blended as described in Example 2. A portion of the composition was compression molded to form thin plates approximately 0.02 inch thick. The molded test plates were nearly free from gel particles of the rubbery copolymer.

A composition was prepared from the copolymer of styrene and alpha-methylstyrene and latex solids of the rubbery copolymer of styrene and butadiene containing 5 percent by weight of polyethylene glycol having an average molecular weight of 600, by similar procedure.

The composition was compression molded to form thin plates approximately 0.02 inch thick. The molded plates were free from gel particles of the rubbery copolymer, i. e. the ingredients were uniformly incorporated with one another.

We claim:

1. In a process for making a molding composition comprising at least one thermoplastic alkenyl aromatic resin which is a member of the group consisting of polymerized monovinyl aromatic hydrocarbons containing a single benzene nucleus and copolymers of from 70 to 99 percent by weight of at least one such monovinyl aromatic hydrocarbon and from 30 to 1 percent of an alpha-alkyl styrene, and a rubber, wherein the alkenyl aromatic resin and the rubber are mechanically worked in admixture with one another at heat-plastifying temperatures between 150° and 250° C. to obtain a uniform composition, the steps which consist in mixing a polyethylene glycol having an average molecular weight of from 200 to 600 with a synthetic latex comprising at least one aqueous colloidal dispersion of a copolymer prepared by the emulsion polymerization of a mixture of from 30 to 70 percent by weight of butadiene and from 70 to 30 percent of styrene, in amount corresponding to from 0.5 to 5 percent by weight of the polyethylene glycol based on the weight of the copolymer, drying the latex and incorporating the latex solids with the heat-plastified thermoplastic alkenyl aromatic resin in proportions corresponding to from 15 to 40 percent by weight of the latex solids and from 85 to 60 percent of the alkenyl aromatic resin.

2. A process for making a molding composition suitable for the production of molded plastic articles, which process comprises mixing a polyethylene glycol having an average molecular weight of from 200 to 600 with a synthetic latex comprising at least one aqueous colloidal dispersion of a copolymer prepared by the emulsion polymerization of a mixture of from 30 to 70 percent by weight of butadiene and from 70 to 30 percent of styrene, in amount corresponding to from 0.5 to 5 percent by weight of the polyethylene glycol based on the weight of the copolymer, drying the latex and incorporating the latex solids with a thermoplastic alkenyl aromatic resin selected from the group consisting of polymerized monovinyl aromatic hydrocarbons containing a single benzene nucleus and copolymers of from 70 to 99 percent by weight of at least one such monovinyl aromatic hydrocarbon and from 30 to 1 percent of an alpha-alkyl styrene in proportions corresponding to from 15 to 40 percent by weight of the latex solids and from 85 to 60 percent of the alkenyl aromatic resin by mechanically working a heat-plastified mixture of the ingredients at a temperature between 150° and 230° C. until a uniform composition is obtained.

3. A process as claimed in claim 2, wherein the alkenyl aromatic resin is a copolymer of from 70 to 99 percent by weight of styrene and from 30 to 1 percent of alpha-methylstyrene.

4. A process as claimed in claim 2, wherein the alkenyl aromatic resin is polystyrene.

5. A process for making a molding composition suitable for the production of molded plastic articles, which process comprises mixing a polyethylene glycol having an average molecular weight of from 200 to 600 with a synthetic latex comprising an aqueous colloidal dispersion of a copolymer prepared by the emulsion polymerization of a mixture of 40 percent by weight of butadiene and 60 percent of styrene, in amount corresponding to from 0.5 to 5 percent by weight of the polyethylene glycol based on the weight of the copolymer, drying the latex and incorporating the latex solids with polystyrene in proportions corresponding to from 15 to 40 percent by weight of the latex solids and from 85 to 60 percent of the polystyrene by mechanically working a mixture of the heat-plastified ingredients at a temperature between 150° and 230° C. until a uniform composition is obtained.

References Cited in the file of this patent

UNITED STATES PATENTS

| | | |
|---|---|---|
| 2,353,228 | Ducca | July 11, 1944 |
| 2,540,996 | Ryden | Feb. 6, 1951 |
| 2,578,518 | Ditz et al. | Dec. 11, 1951 |
| 2,588,660 | Roche et al. | Mar. 11, 1952 |
| 2,623,863 | Dieckmann et al. | Dec. 30, 1952 |